United States Patent
Tohyama et al.

(10) Patent No.: US 6,763,135 B1
(45) Date of Patent: Jul. 13, 2004

(54) IMAGE PROCESSING APPARATUS

(75) Inventors: Daisetsu Tohyama, Toyokawa (JP); Takayuki Nabeshima, Toyokawa (JP); Katsuaki Tajima, Toyokawa (JP); Toshio Tsuboi, Okazaki (JP); Junji Nishigaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 485 days.

(21) Appl. No.: 09/663,931

(22) Filed: Sep. 18, 2000

(30) Foreign Application Priority Data

Sep. 21, 1999 (JP) .......................................... 11-266560

(51) Int. Cl.[7] .............................................. G06K 9/00
(52) U.S. Cl. ..................................... 382/167; 382/165
(58) Field of Search .............................. 382/162, 167, 382/165, 170; 345/590; 358/1.9, 2.1, 3.24, 520, 522

(56) References Cited

U.S. PATENT DOCUMENTS 6,023,527 A * 2/2000 Narahara ..................... 382/167
6,266,152 B1 * 7/2001 Nakajima ................... 358/1.9

FOREIGN PATENT DOCUMENTS

| JP | 5-167839 | 7/1993 |
| JP | 7-287748 | 10/1995 |
| JP | 8-111786 | 4/1996 |
| JP | 9-312777 | 12/1997 |
| JP | 10-200778 | 7/1998 |

* cited by examiner

*Primary Examiner*—Phuoc Tran
(74) *Attorney, Agent, or Firm*—McDermott Will & Emery LLP

(57) ABSTRACT

An image output system is realized in which many operations are not required for the color reproduction. As a preprocessor of an output device 20 for reproducing an image, an image processing apparatus 100 is provided that comprises attribution decision portions 152 and 153 for deciding the attribution of input image D1, a color decision portion 151 for deciding whether the input image is an image within a color reproduction range or not, a color range change portion 120 for changing the color range of the input image when it is decided that the input image is not an image within the color reproduction range and a process contents switching portion 123 for switching the change contents of the color range in the color range change portion 120 in accordance with the decisions of the attribution decision portions 152 and 153.

12 Claims, 7 Drawing Sheets

_US 6,763,135 B1_

IMAGE PROCESSING APPARATUS

This application is based on Japanese Patent Application No. 266560/1999 filed on Sep. 21, 1999, the contents of which are incorporated herein by reference.

BACKGROUND OF THE INVENTION

1. Field of the Invention

The present invention relates to an image processing apparatus for outputting an image by a printer or a display.

2. Description of the Prior Art

When printing out or displaying an image read by a color scanner or a computer graphics, a process is performed as necessary, in which colors of the image data are converted into colors within a color reproduction range that is unique to the output device. For example, there are a first color compression method and a second color compression method. In the first color compression method, a color range of the image data is compressed for every hue so as to meet the color reproduction range of the output device when the output device has a narrower color reproduction range or when the image data include data which are out of the color reproduction range of the output device. In the second color compression method, only the color which are out of the color reproduction range is converted into a similar color within the color reproduction range. A system that can use a different color compression method in accordance with a kind or the number of colors of the image is proposed in Japanese unexamined patent publication No. 8-111786, for example.

In the first color compression method, there is a problem that since the color data of the entire image data are corrected, a process time becomes long though it is suitable for an image such as a full color image or a picture image in which a color gradation is important. In the second color compression method, there is a problem that since only the color which is out of the color reproduction range is compressed, though the process time is shortened, the color gradation is deteriorated. Therefore, a false contour is generated in the border of the compressed color which is out of the color reproduction range and other colors, resulting in a deterioration of the image quality. In addition, when instructing the image output, an operator has to assign the necessity of the color compression and to select the optimal process.

SUMMARY OF THE INVENTION

The object of the present invention is to realize an image output system in which many operations are not required for the color reproduction.

An image processing apparatus according to the present invention is used for receiving image data representing an image and for outputting the data to the output device that reproduces the image. The apparatus comprises an attribution controller for deciding attribution of the image in accordance with the received image data, a decision controller for deciding whether the color range of the image is within a color reproduction range of the output device in accordance with the received image data, a color correction controller for performing a correction on the received image data when the attribution controller has decided that the image is not within the color reproduction range so as to make the color range of the image within the color reproduction range and a switching controller for switching the contents of the correction in the color correction controller in accordance with the attribution that the attribution controller has decided.

An image processing method according to the present invention is used for receiving image data representing an image and for outputting the data to the output device that reproduces the image. The method comprises an attribution step of deciding attribution of the image in accordance with the received image data, a decision step of deciding whether the color range of the image is within a color reproduction range of the output device in accordance with the received image data, a color correction step of performing a correction on the received image data when the attribution step has decided that the image is not within the color reproduction range so as to make the color range of the image within the color reproduction range, and a switching step of switching the contents of the correction in the color correction step in accordance with the attribution that the attribution step has decided.

DESCRIPTION OF THE PREFERRED EMBODIMENTS

Hereinafter, the present invention will be explained more in detail with reference to embodiments and drawings.

Figure 1:
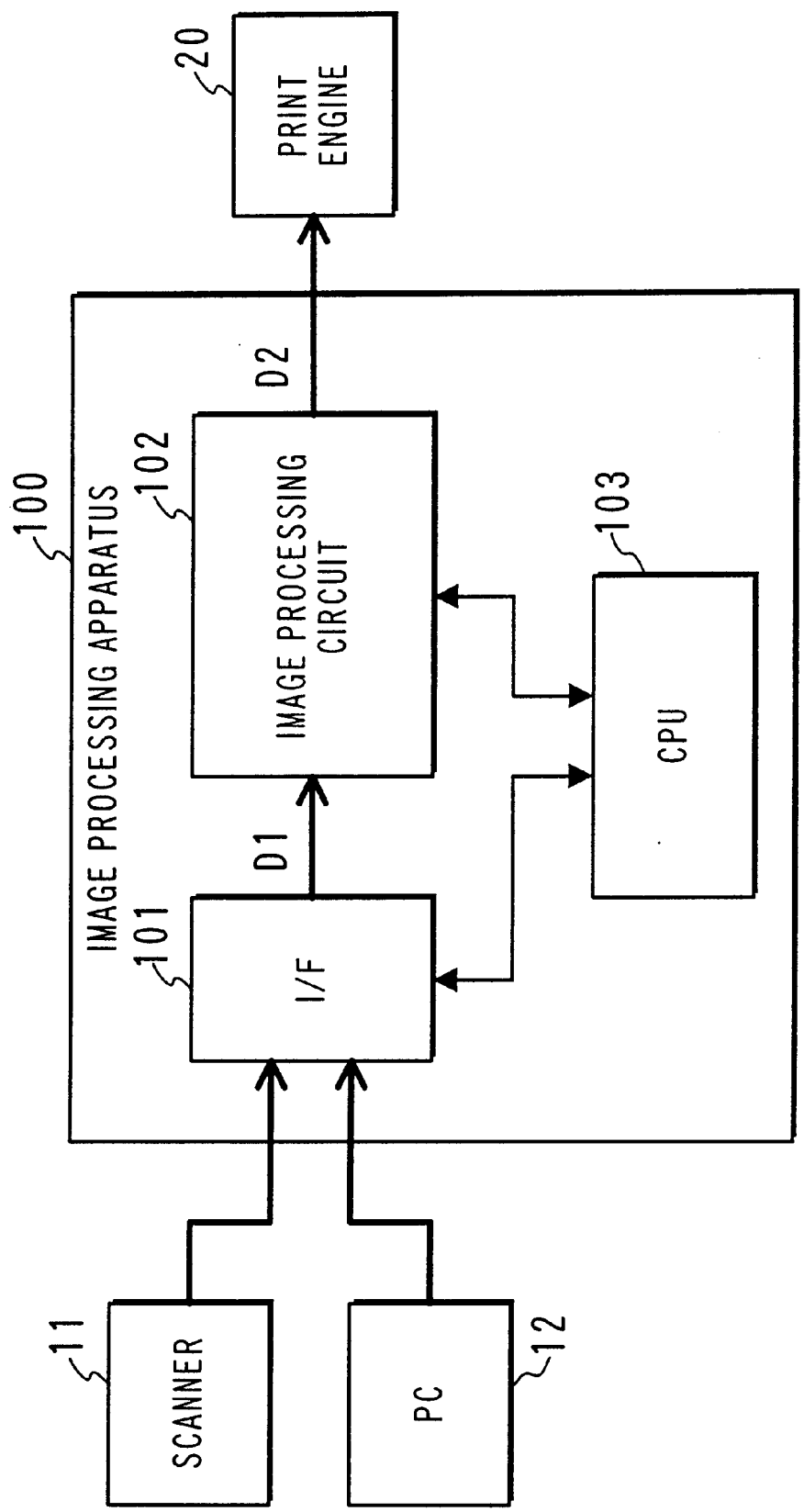
FIG. 1 is a block diagram showing an entire configuration of an image output system according to the present invention.

FIG. 1 is a block diagram showing an entire configuration of an image output system according to the present invention.

The image output system 1 comprises a scanner 11 that reads an original by decomposing its color into three colors, i.e., red (R), green (G) and blue (B), a computer 12 that issues a print job, a print engine 20 that prints a color image, and an image processing apparatus 100. More specifically, the image output system 1 is a computer system including a color printer with a print engine 20, an image reader with a scanner 11, or a combination machine thereof. The image output system 1 is used for printing a document generated by the computer 12 or for copying the original.

The image processing apparatus 100 comprises an input interface 101, an image processing circuit 102 and a CPU 103 as a control means. The image processing apparatus 100 is built in the color printer or the image reader. Otherwise, it is used as a stand-alone apparatus connected by a cable. The input interface 101 selects the scanner 11 or the computer 12 as an input device and sends image data D1 from the input device to an image processing circuit 102. The image processing circuit 102 can perform color mapping in which RGB of the image data D1 is converted into CMYK, and the color range is changed to match the color reproduction range of the printer. The image data D2 after the image process is sent to the print engine 20.

Figure 2:
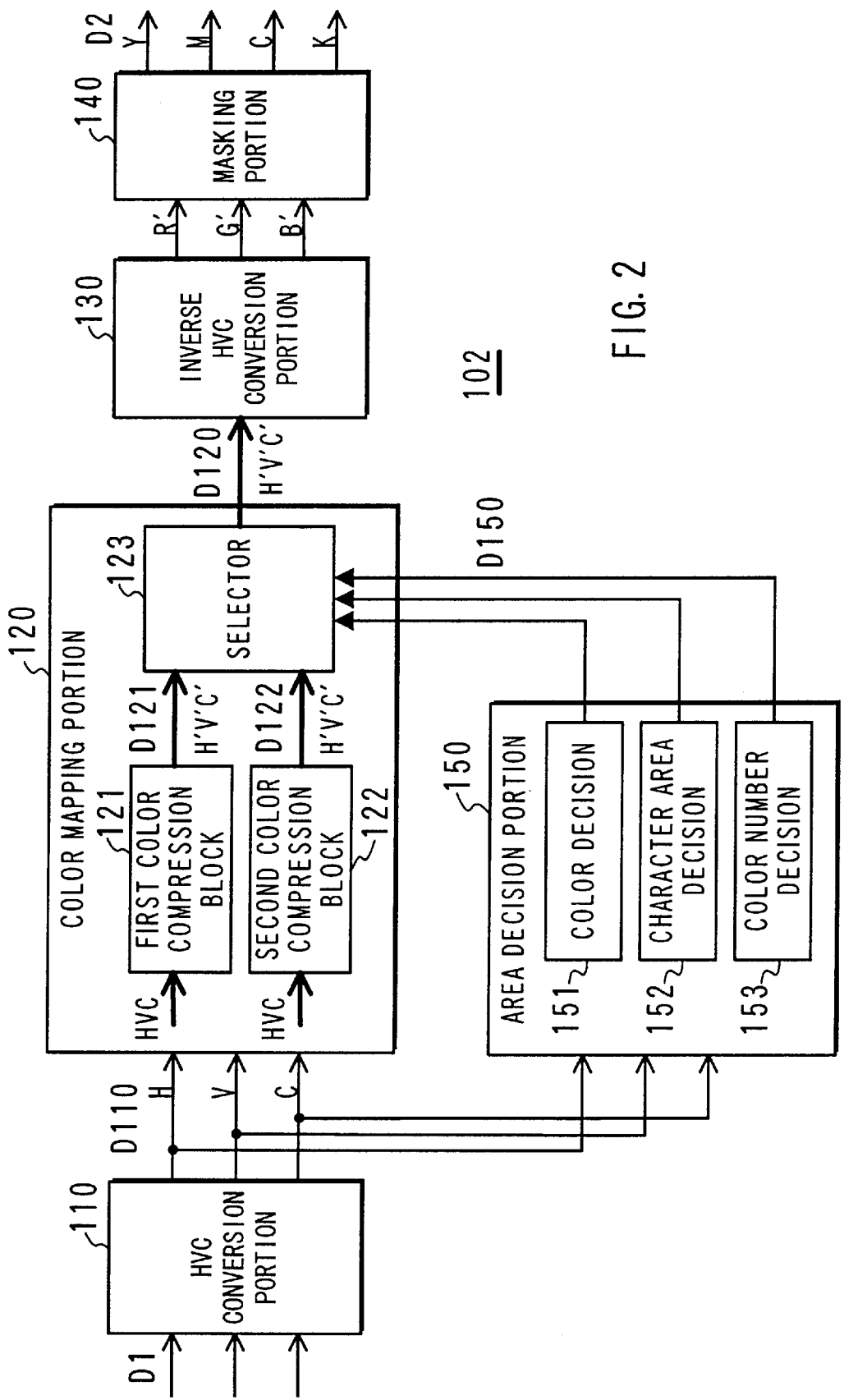
FIG. 2 is a block diagram of the image processing circuit.
Figure 3A:
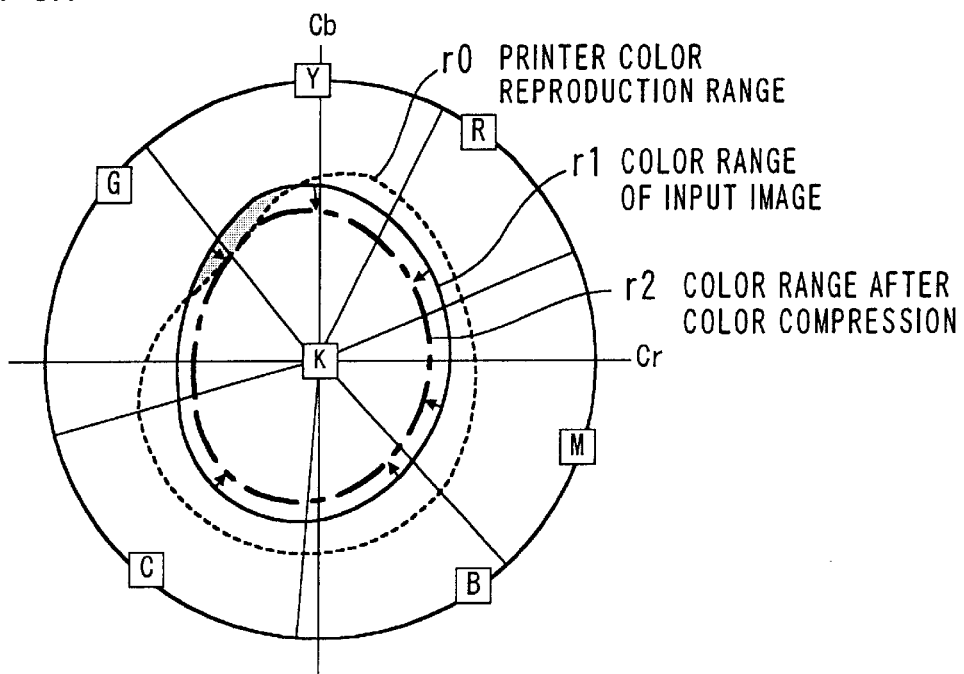
FIGS. 3A and 3B are schematic diagrams of the color mapping according to the present invention.
Figure 3B:
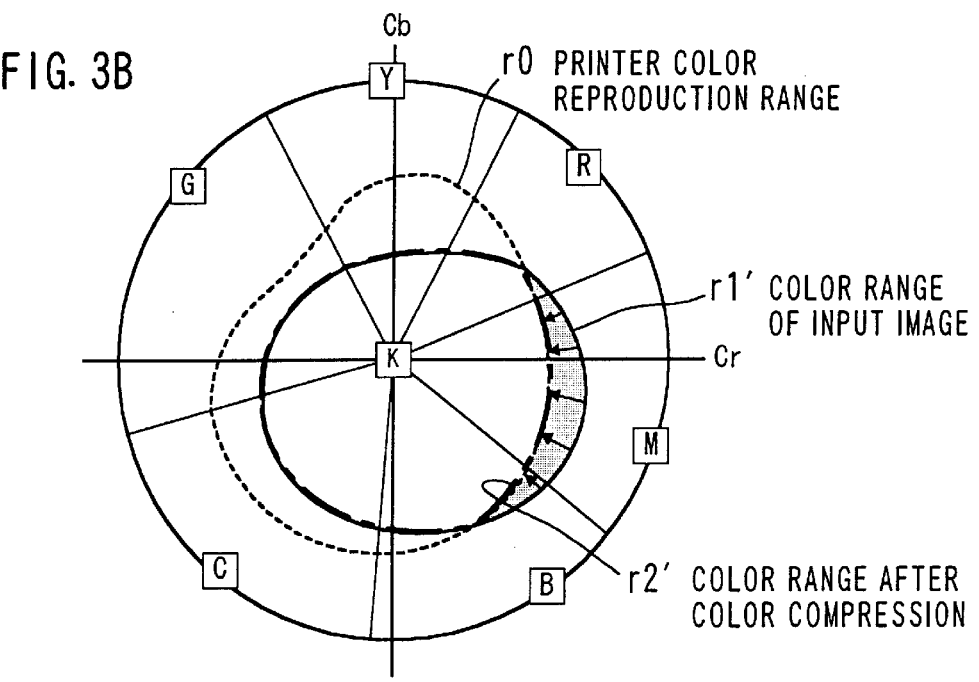

FIG. 2 is a block diagram of the image processing circuit. FIGS. 3A and 3B are schematic diagrams of the color mapping according to the present invention.

The image data D1 transmitted by the input interface 101 is processed by an HVC conversion portion 110 for a distortion correction and a normalization process for each color R, G or B and is converted into image data D110 that are represented by a hue H, a lightness V and a chroma C. A color mapping portion 120 performs a process of changing the color range r1 (see FIGS. 3A and 3B) of the HVC color space of the image data D110. The image data D120 from the color mapping portion 120 are changed from the HVC color space back to the RGB color space by an inverse HVC conversion portion 130 and then are converted into data D2 indicating densities of C, M, Y, K for printing by a masking portion 140.

The color mapping portion 120 includes a first color compression block 121, a second color compression block 122 and a selector 123 for selecting one of data D121 and data D122 that are obtained by the blocks 121 and 122. The operation of the selector 123 is controlled by decision data D150 from an area decision portion 150. The first color compression block 121 compresses the color range r1 uniformly for every hue as shown in FIG. 3A and outputs the data D122 of the color range r2. In contrast, the second color compression block 122 replaces only the color outside the color reproduction range r0 of the print engine 20 in the color range r1' into a similar color within the color reproduction range r0 as shown in FIG. 3B and outputs the data D121 of the color range r2'. The first color conversion block 121 and the second color compression block 122 are supplied with parameters defining the process contents thereof by the CPU 103.

The area decision portion 150 includes a color decision block 151 that decides whether the color range r1 of the data D110 is included in the color reproduction range r0 (within the color reproduction range or not), a character area decision block 152 that decides whether the pixel is a part of a character or not and a color number decision block 153 that decides whether the image data D110 are full color image data or not. The above-mentioned decision data D150 represent a combination of the decision results of these three blocks.

In this embodiment, as a process in the case where the color range r1 is not within the color reproduction range, the first color compression method or the second color compression method is used selectively in accordance with a color attribution of the image. In the case of a full color image, the second color compression causes an imbalance of color since only a specific color is replaced with another color. In order to avoid this, the first color compression method is used in which the entire image data are the object of process. However, in the case of a color image such as a colored business document, it is not conspicuous even if a specific color is replaced with another color. Therefore, the second color compression method is adapted in which the reproducibility of a color within the color reproduction range is not deteriorated.

Figure 4A:
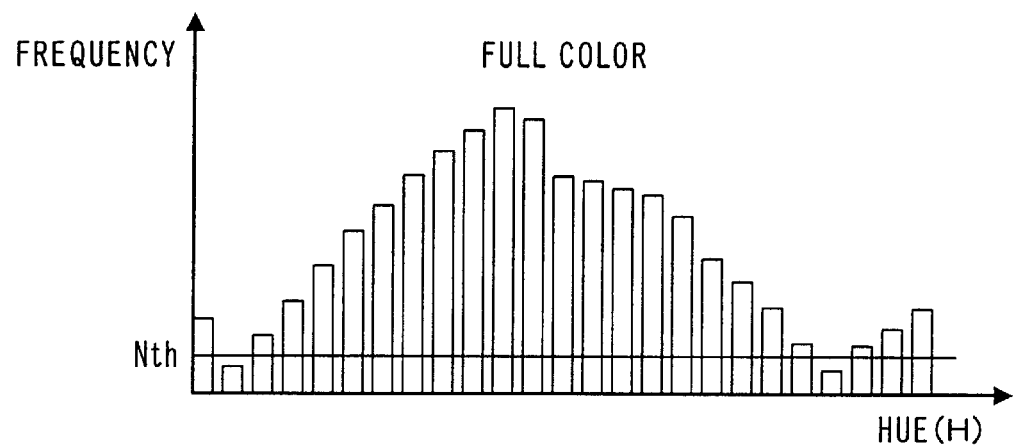
FIGS. 4A and 4B show examples of a histogram for each hue.
Figure 4B:
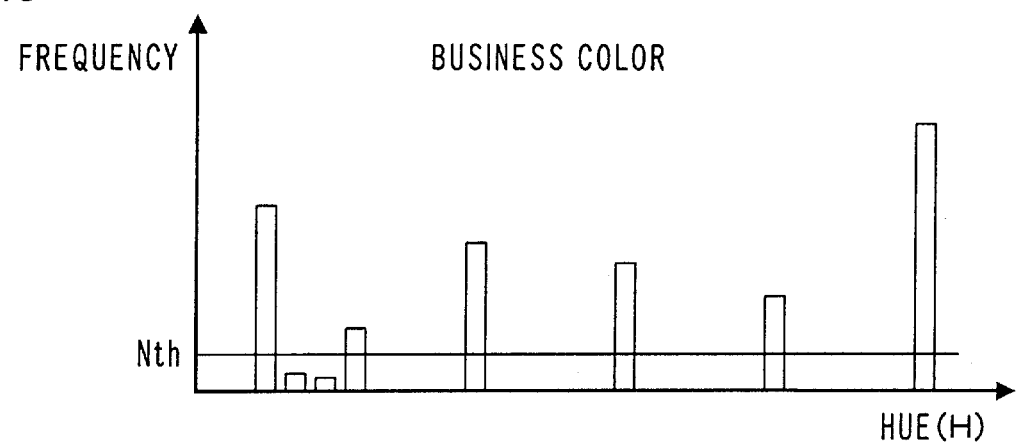

FIGS. 4A and 4B show examples of a histogram for each hue.

The decision whether the data are full color image data or not is performed by generating the histogram that shows the number of pixels of each hue of the image data D110. In general, a natural image includes relatively a lot of colors as shown in FIG. 4A, while an artificial image such as a business document includes less colors. The color number decision block 153 counts the number of hues having a frequency more than or equal to a threshold value Nth and decides that the image is a full color image if the count value Hc is a predetermined value Hth (e.g., 20) or more.

Figure 5:
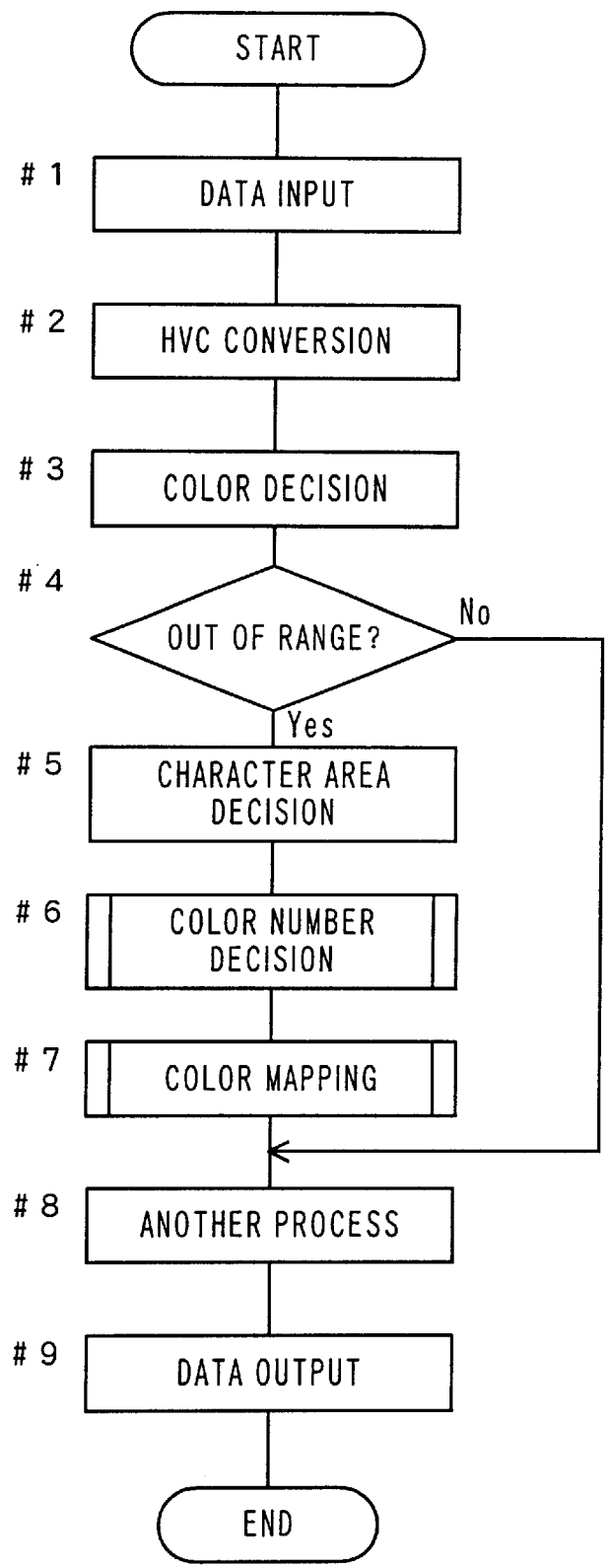
FIG. 5 is a flowchart showing a general operation of the image processing apparatus.

FIG. 5 is a flowchart showing a general operation of the image processing apparatus.

The image data D1 are fetched and are converted into data in the HVC color space, so that an inclusion relation between the color range r1 and the color reproduction range r0 is decided (#1–#3). If the image data D1 are data outside the color reproduction range, the decision whether the image is a character or not and the decision of the number of colors are performed, and then the color mapping is performed for correcting the color range in accordance with the result (#4–#7). After that, another process such as a masking process is performed so as to output the CMYK image data D2 obtained by the process (#8, #9). If the image data D1 are data within the color reproduction range, the process of steps #5 through #7 is substantially omitted.

Figure 6:
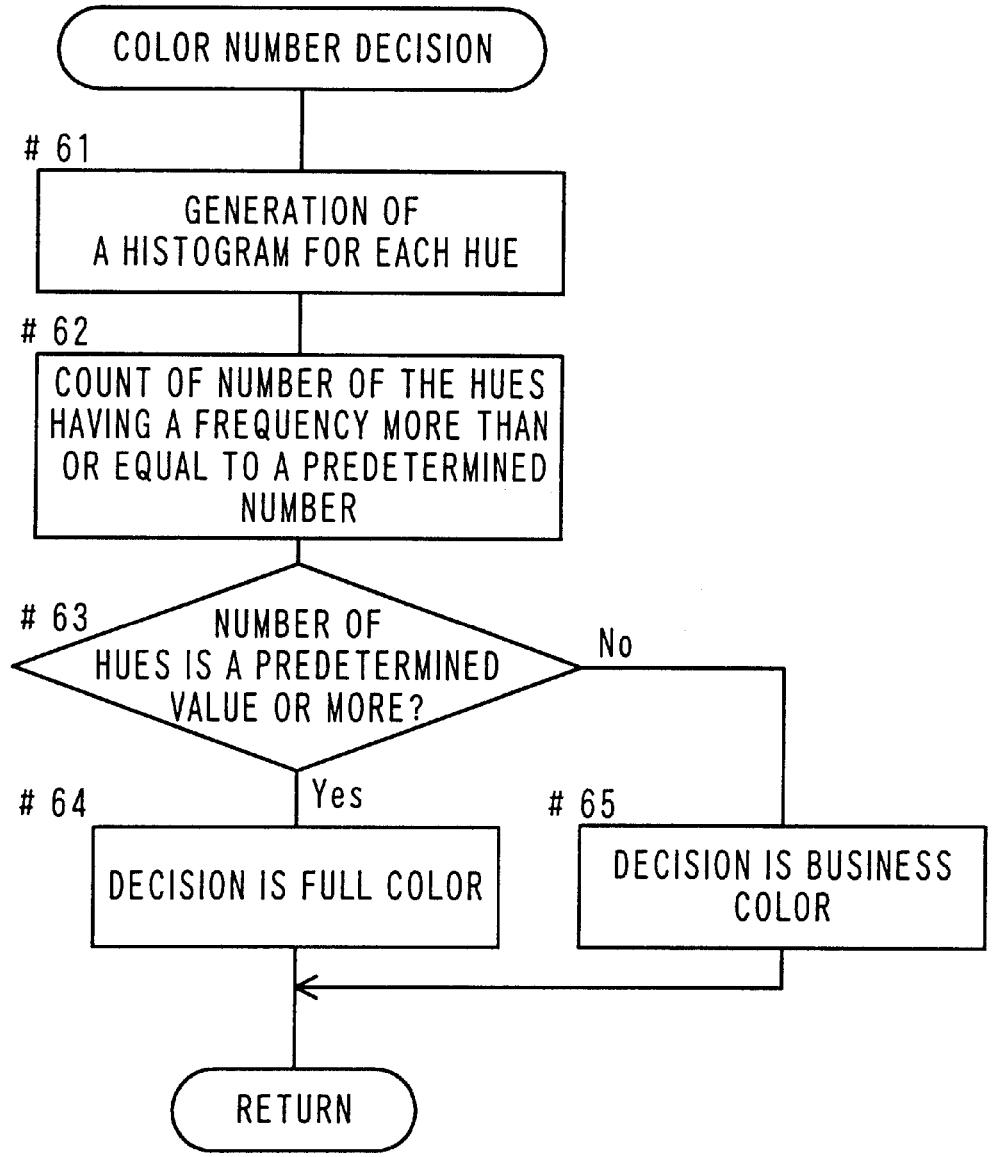
FIG. 6 is a flowchart of a subroutine for deciding the number of colors.

FIG. 6 is a flowchart of a subroutine for deciding the number of colors.

The number of pixels is counted for each section of the color space that is divided by hue so as to generate a histogram for each hue (#61), and the number of hues is counted whose frequency is an effective number more than or equal to a threshold vale Nth (#62). If the count number of hue is a predetermined number or more, it is decided that the image is a full color image, while it is decided that the image is a business color if the count number of hue is less than the predetermined number (#63, #65).

Figure 7:
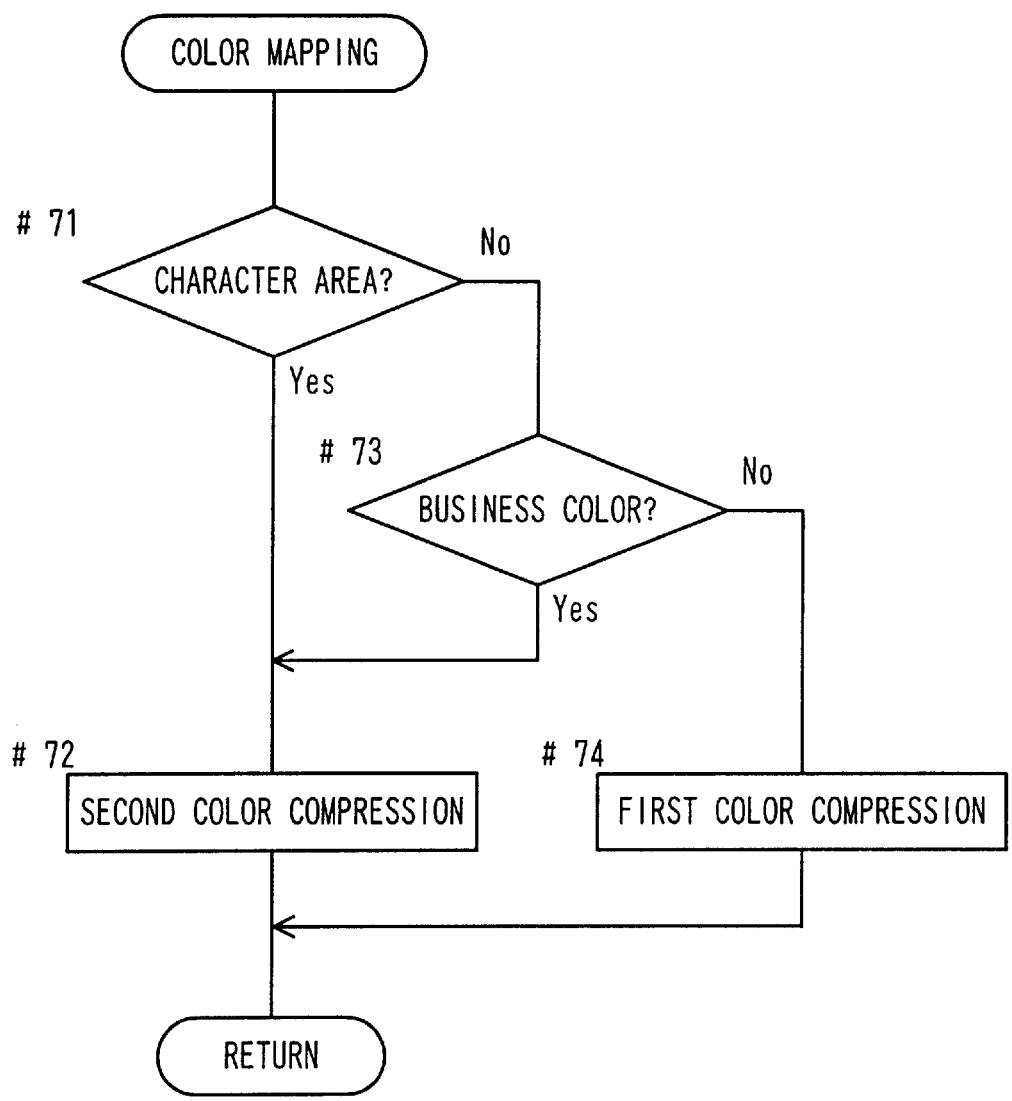
FIG. 7 is a flowchart of a subroutine for color mapping.

FIG. 7 is a flowchart of a subroutine for color mapping.

The second color compression block 122 performs the process for the image that was decided to be a character area (#71, #72). The image that was decided not to be a character area but to be a business color is also processed by the second color compression (#73, #72). The image that was decided neither to be a character area nor a business color is processed by the first color compression block 121 (#73–#74).

In this embodiment, if a color outside the color reproduction range has a character attribution, it is considered the function as an accent is maintained and the entire image quality can be maintained even if only the color is compressed, since there is strong possibility that the color was added for making the accent. Therefore, the second color compression is performed in which only the color is compressed. Thus, the image quality is not deteriorated and the process efficiency can be improved. In addition, in the case of a non-character area, i.e., a picture area, if it is a business color having the less number of colors, it is considered that the gradation may not be essential for the same reason. Therefore, the second color compression is performed, too.

In the case of a full color image, the first color compression is performed so as to maintain the gradation that is important for the full color image in the color compression. Therefore, no false contour is generated and high image quality can be maintained.

In the above-mentioned embodiment, the kind and the number of the input device and the output device is not limited to the example. If there are plural output devices, the image processing apparatus 100 may have an output interface for selecting an output device.

According to the above-mentioned embodiment, in the case where the image data have data outside the color reproduction range, the efficiency of image processing can be improved and the image quality can be stabilized in changing the color range without much load on an operator.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processing apparatus for receiving image data representing an image and for outputting the data to a output device that reproduces the image, the apparatus comprising:

an attribution controller for deciding attribution of the image in accordance with the received image data;

a decision controller for deciding whether the color range of the image is within a color reproduction range of the output device in accordance with the received image data;

a color correction controller for performing a correction on the received image data when the decision controller has decided that the image is not within the color reproduction range so as to make the color range of the image within the color reproduction range; and a switching controller for switching contents of the correction in the color correction controller in accordance with the attribution that the attribution controller has decided.

2. The image processing apparatus according to claim 1, wherein the attribution controller decides whether the image is a full color image or not.

3. The image processing apparatus according to claim 2, wherein the attribution controller counts the number of images for each hue in accordance with the image data and decides that the image is a full color image if the number of the hues whose count value exceeds a predetermined value is a predetermined number or more.

4. The image processing apparatus according to claim 1, wherein the color correction controller is capable of performing selectively a first correction process of compressing the image data over the entire color range of the image data or a second correction process of compressing the image data only for the color range which is out of the color reproduction range, and the switching controller selects one of the first correction process and the second correction process in accordance with the attribution.

5. The image processing apparatus according to claim 4, wherein the switching controller selects the first correction process when the attribution indicates a full color image.

6. The image processing apparatus according to claim 4, wherein the switching controller selects the second correction process when the attribution indicates a text image.

7. An image processing method for receiving image data representing an image and for outputting the data to an output device that reproduces the image, the method comprising:

an attribution step of deciding attribution of the image in accordance with the received image data;

a decision step of deciding whether the color range of the image is within a color reproduction range of the output device in accordance with the received image data;

a color correction step of performing a color correction on the received image data when the decision step has decided that the image is not within the color reproduction range so as to make the color range of the image within the color reproduction range; and a switching step of switching contents of the correction in the color correction step in accordance with the attribution that the attribution step has decided.

8. The image processing method according to claim 7, wherein the attribution step includes the step of deciding whether the image is a full color image or not as the attribution.

9. The image processing method according to claim 8, wherein the attribution step includes the steps of counting the number of images for each hue in accordance with the image data and deciding that the image is a full color image if the number of the hues whose count value exceeds a predetermined value is a predetermined number or more.

10. The image processing method according to claim 7, wherein the color correction step includes the step of performing selectively a first correction process of compressing the image data over the entire color range of the image data or a second correction process of compressing the image data only for the color range which is out of the color reproduction range, and the switching step includes the step of selecting one of the first correction process and the second correction process in accordance with the attribution.

11. The image processing method according to claim 10, wherein the first correction process is selected when the attribution indicates a full color image.

12. The image processing method according to claim 10, wherein the second correction process is selected when the attribution indicates a text image.

* * * * *